United States Patent Office 2,865,673
Patented Dec. 23, 1958

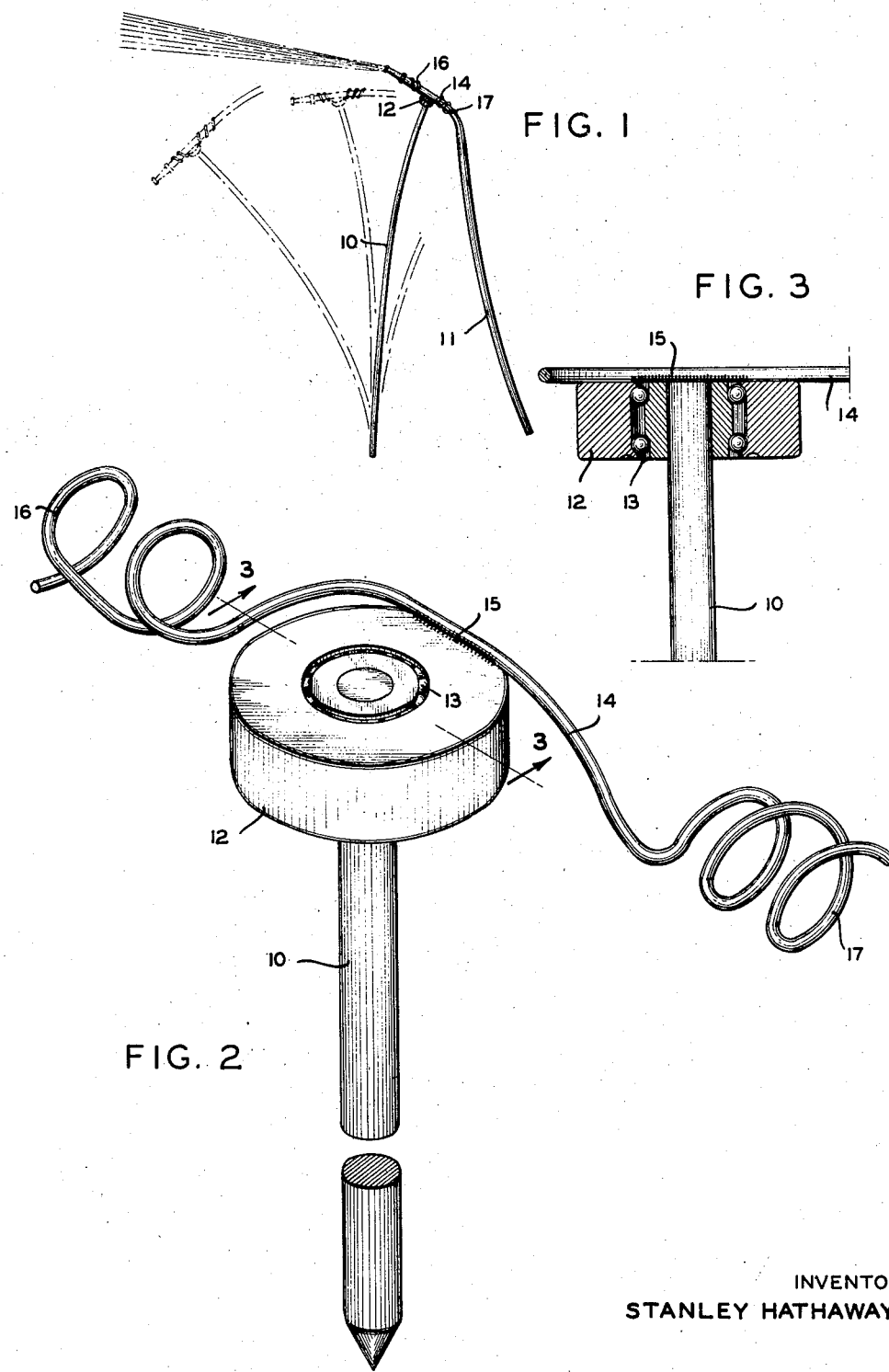

2,865,673
WATER SPRINKLING DEVICE
Stanley Hathaway, Greenville, N. C.
Application May 28, 1957, Serial No. 662,130
5 Claims. (Cl. 299—65)

This invention relates to fluid distribution and more particularly to the distribution of water on areas desired to be intensely cultivated such as lawns, in gardens and other places.

The invention is concerned especially with the sprinkling of water on lawns in gardens and the like and with sprinklers used in so doing including those attached to the end of a flexible garden hose to cause maximum distribution of the water discharged from such hose.

Sprinklers of various types have been employed about the home and elsewhere in the distribution of water, however, these have been subject to criticism because of their bulkiness, their high cost, unsatisfactory operation, and the like.

It is an object of the invention to overcome the difficulties enumerated and to provide a support for a flexible water hose which not only will support the hose while the water is being discharged therefrom but will support it in such a manner that the end of the hose carrying the nozzle will slowly oscillate to cause maximum distribution of the water over the adjacent area.

Another object of the invention is to provide a simple and inexpensive sprinkler hose holder which can be easily produced from readily available materials in a minimum of time, and which can be quickly installed and operated.

Other objects and advantages of the invention will be apparent from the foregoing description taken in connection with the accompanying drawing wherein:

Fig. 1 is a perspective illustrating one application of the invention;

Fig. 2, an enlarged perspective of the hose holder; and

Fig 3, a section on the line 3—3 of Fig. 2.

Briefly stated the invention comprises a unit for conversion of a flexible garden hose into a sprinkler by the attachment of a shaft one end of which is adapted to be inserted in the ground and the other end is adapted to have a skate wheel rotatably fixed thereto and is adapted to have a hose supporting yoke mounted on said skate wheel, such yoke having coils at each end so that the hose can be engaged and supported at the desired angle for maximum sprinkling. Also, due to the pressure of the water and the flexibility of the hose when the pressure builds up after movement in one direction the hose will reverse and swing in the opposite direction.

The present invention comprises a slender shaft 10 of metal or other material capable of flexing while supporting the weight of the end of a flexible garden hose. This shaft may be of one or more sections and is adapted to have its end placed in the ground with its other end located a substantial distance above the ground for supporting the end of a garden hose. To the upper end of the shaft is attached a skate wheel 12 supported by suitable bearings 13 on the shaft so that the wheel may revolve freely. Attached across the skate wheel is a wire yoke 14 for supporting a flexible garden hose and having its center attached by solder or welding 15 to the wheel with its ends terminating in coils 16 and 17 in which the hose is adapted to be supported. Such coils may be produced in a machine or they may be formed by hand so that the garden hose may be supported with its discharge end pointed upwardly, downwardly, horizontally or as desired.

When the hose is thus supported and water is allowed to flow through it the slender shaft which supports the hose will flex or bend with a whipping action and the skate wheel will rotate or oscillate on its axis a limited amount, until, due to the buildup of pressure and tension in the hose it will reverse its direction causing it to swing in the opposite direction resulting in maximum movement of the nozzle and the distribution of the water discharged from the same over a relatively large area substantially greater than if the nozzle were held rigidly.

Thus a rock and roll type of sprinkler is provided over which a degree of control may be exerted by varying the diameter of the supporting shaft, by varying the depth the shaft is inserted in the ground, and by varying the distance between the tip of the nozzle and the skate wheel.

It will be apparent from the foregoing that the present invention converts a flexible hose into a sprinkler system by the mere attachment of a shaft, a skate wheel and a wire support for the nozzle.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device for converting a flexible garden hose into a sprinkler comprising a relatively slender shaft adapted to have its lower end anchored in the ground, a bearing member rotatably mounted on the opposite end of said shaft having a portion freely rotatable relative to such shaft, a hose supporting yoke mounted on said freely rotatable member with its extremities extending outwardly in opposite direction from said member, said oppositely extending extremities having hose encircling coils into which spaced portions of a hose may be readily inserted and said hose may pivot around the free end of said shaft and due to the force of the water discharged from the hose to cause said shaft to flex and swing said hose with a whipping action.

2. A device for converting a garden hose into a sprinkler comprising a relatively slender shaft adapted to have one end inserted in the ground, a freely rotatable member on the other end of said slender shaft, and a hose supporting yoke on said rotatable member and having hose engaging portions on opposite sides of said rotatable member and spaced outwardly therefrom for engaging a hose in spaced relation for holding the same so that water may be discharged therefrom with the pressure of the water building up to cause said shaft to flex with a whipping action and the swinging of the hose and reversal of such swinging movement.

3. A sprinkler comprising an upright support, a bearing member freely rotatable on said support, a yoke mounted across said bearing member and having hose engaging portions at its opposite ends in which a flexible garden hose is adapted to be inserted and when the pressure of the water builds up will cause said shaft to flex with a whipping action and produce oscillation of said hose.

4. A sprinkler comprising a discharge nozzle, a flexible conduit for supplying fluid under pressure to said nozzle for discharge therefrom, an elongated transverse support for said conduit adjacent said nozzle, and a relatively slender flexible shaft having one end rotatably connected to said support and adapted to be disposed in upright position with said support on its upper end and with its lower end secured in relatively fixed position whereby pressure in said conduit and the release of a portion of the same through said nozzle will cause said nozzle to rotate and reverse its direction repeatedly and at the same time to sway back and forth due to the flexing of said shaft with a whipping action.

5. A sprinkler comprising a relatively slender flexible shaft adapted to be disposed with its axis upright and held from its lower end portion, a support for a hose having a nozzle at its end, said support being disposed across the upper end of said shaft, and a freely rotatable connection between said support and said shaft whereby the relief of pressure with the flow of fluid from said hose will cause flexing of said shaft with a whipping action and oscillation of said hose.

References Cited in the file of this patent

UNITED STATES PATENTS

| | | |
|---|---|---|
| 1,542,648 | Thomas | June 16, 1925 |
| 2,087,175 | Voight | July 13, 1937 |
| 2,687,329 | Hunter | Aug. 24, 1954 |

FOREIGN PATENTS

| | | |
|---|---|---|
| 106,092 | Australia | Dec. 7, 1938 |